(12) United States Patent
Bar (10) Patent No.: US 12,508,090 B2
(45) Date of Patent: Dec. 30, 2025

(54) SYNCHRONIZED ROBOTIC BONE MILLING (71) Applicant: LEM Sugical AG, Bern (CH)

(72) Inventor: Yossi Bar, Bern (CH)

(73) Assignee: LEM Surgical AG, Bern (CH)

( * ) Notice: Subject to any disclaimer, the term of this patent is extended or adjusted under 35 U.S.C. 154(b) by 0 days.

(21) Appl. No.: 18/613,961

(22) Filed: Mar. 22, 2024

(65) Prior Publication Data
US 2024/0261046 A1 Aug. 8, 2024

Related U.S. Application Data (63) Continuation of application No. PCT/IB2022/058972, filed on Sep. 22, 2022.
(Continued)

(51) Int. Cl.
A61B 34/30 (2016.01)
A61B 17/16 (2006.01)
(Continued)

(52) U.S. Cl.
CPC .......... *A61B 34/32* (2016.02); *A61B 17/1671* (2013.01); *A61B 90/03* (2016.02);
(Continued)

(58) Field of Classification Search
CPC ......... A61B 34/32; A61B 34/35; A61B 34/70; A61B 2034/301; A61B 2034/302;
(Continued)

(56) References Cited

U.S. PATENT DOCUMENTS 6,033,415 A * 3/2000 Mittelstadt ................ G06T 3/02
600/425
6,063,095 A * 5/2000 Wang ..................... A61B 34/37
606/139
(Continued)

FOREIGN PATENT DOCUMENTS

EP 3900607 A1 10/2021
GB 2593741 A * 10/2021 ............ A61B 34/30
(Continued)

OTHER PUBLICATIONS

PCT/IB2022/058972 International Search Report and Written Opinion dated Jan. 13, 2023.

*Primary Examiner* — Anu Ramana
(74) *Attorney, Agent, or Firm* — Wilson Sonsini Goodrich & Rosati (57) ABSTRACT Described herein are robotically coordinated systems and methods for safe and efficient spinal decompression and bone milling. In various embodiments, a robotic spinal surgery system is provided with at least three robotic arms co-located on a single mobile base wherein the movement of the robotic arms is coordinated by a central control unit on the base. The system further comprises tools for spinal decompression, elements for protection of nervous tissue and navigation cameras. The nerve protection elements are placed between bony anatomy structures and nervous structures to prevent contact of the spinal decompression tools with the nervous structures. The nerve protection elements further include safety components that can optionally close electrical circuits with the decompression tools and sense or stimulate the nervous structures. Methods of deploying the inventive system in surgery are also provided.

12 Claims, 6 Drawing Sheets

Related U.S. Application Data (60) Provisional application No. 63/291,459, filed on Dec. 20, 2021.

(51) Int. Cl.
   *A61B 34/32* (2016.01)
   *A61B 90/00* (2016.01)
   *A61B 17/00* (2006.01)

(52) U.S. Cl.
   CPC .............. *A61B 2017/00039* (2013.01); *A61B 2017/00057* (2013.01); *A61B 2090/3916* (2016.02); *A61B 2090/3954* (2016.02); *A61B 2090/3966* (2016.02)

(58) Field of Classification Search
   CPC ........ A61B 2034/303; A61B 2034/304; A61B 2034/305; A61B 34/76; A61B 2017/0262
   See application file for complete search history.

(56) References Cited

U.S. PATENT DOCUMENTS

| | | | | |
|---|---|---|---|---|
| 8,137,284 | B2* | 3/2012 | Miles | A61B 17/3421 606/32 |
| 8,579,902 | B2* | 11/2013 | Bleich | A61B 17/3403 606/79 |
| 9,125,680 | B2 | 9/2015 | Kostrzewski et al. | |
| 9,737,371 | B2* | 8/2017 | Romo | A61B 34/30 |
| 9,763,741 | B2* | 9/2017 | Alvarez | A61B 1/00149 |
| 10,039,605 | B2* | 8/2018 | Kostrzewski | A61B 17/17 |
| 10,265,128 | B2* | 4/2019 | Bonutti | A61B 17/8852 |
| 10,531,927 | B2* | 1/2020 | Crawford | A61B 5/062 |
| 10,716,958 | B2 | 7/2020 | Neff | |
| 11,103,316 | B2* | 8/2021 | Kostrzewski | A61B 34/30 |
| 11,172,997 | B2* | 11/2021 | Kostrzewski | A61B 90/06 |
| 11,266,470 | B2* | 3/2022 | Morard | A61B 17/1703 |
| 11,304,760 | B1* | 4/2022 | Roh | A61B 34/30 |
| 11,432,892 | B1 | 9/2022 | Turgeman et al. | |
| 11,464,573 | B1 | 10/2022 | Roh et al. | |
| 11,553,969 | B1* | 1/2023 | Lang | G06T 7/0012 |
| 11,786,206 | B2* | 10/2023 | Steines | G06F 3/04815 378/91 |
| 11,857,277 | B2* | 1/2024 | Doisneau | A61B 17/12136 |
| 12,029,511 | B2 | 7/2024 | Bar | |
| 12,042,171 | B2* | 7/2024 | Junio | A61B 90/03 |
| 12,059,211 | B2* | 8/2024 | Becker | A61B 34/10 |
| 2015/0032164 | A1 | 1/2015 | Crawford et al. | |
| 2015/0119637 | A1 | 4/2015 | Alvarez et al. | |
| 2015/0119638 | A1* | 4/2015 | Yu | A61B 34/71 600/102 |
| 2018/0193101 | A1 | 7/2018 | Hashimoto | |
| 2019/0380788 | A1* | 12/2019 | Becker | A61B 34/10 |
| 2021/0186615 | A1 | 6/2021 | Shmayahu et al. | |
| 2021/0338348 | A1 | 11/2021 | Zehavi et al. | |
| 2022/0071720 | A1* | 3/2022 | Sexson | A61B 34/10 |
| 2022/0079687 | A1 | 3/2022 | Sexson et al. | |
| 2022/0160445 | A1 | 5/2022 | Meglan et al. | |
| 2022/0168048 | A1 | 6/2022 | Shoham et al. | |
| 2022/0202511 | A1* | 6/2022 | Herregodts | A61B 17/8866 |
| 2022/0241032 | A1 | 8/2022 | Zucker et al. | |
| 2022/0346882 | A1 | 11/2022 | Zehavi et al. | |

FOREIGN PATENT DOCUMENTS

| | | |
|---|---|---|
| WO | WO-2016087539 A2 | 6/2016 |
| WO | WO-2016137612 A1 | 9/2016 |
| WO | WO-2016149345 A1 | 9/2016 |
| WO | WO-2020020898 A1 | 1/2020 |
| WO | WO-2022044009 A1 | 3/2022 |
| WO | WO-2022069993 A1 | 4/2022 |
| WO | WO-2022195460 A1 | 9/2022 |
| WO | WO-2023067415 A1 | 4/2023 |
| WO | WO-2023118984 A1 | 6/2023 |
| WO | WO-2023118985 A1 | 6/2023 |
| WO | WO-2023144602 A1 | 8/2023 |
| WO | WO-2023152561 A1 | 8/2023 |
| WO | WO-2023223215 A1 | 11/2023 |
| WO | WO-2023237922 A1 | 12/2023 |
| WO | WO-2023248005 A1 | 12/2023 |

* cited by examiner

SYNCHRONIZED ROBOTIC BONE MILLING

CROSS-REFERENCE TO RELATED APPLICATIONS

This application is a continuation of PCT Application No. PCT/IB2022/058972, filed Sep. 22, 2022, which claims the benefit of priority of U.S. Provisional No. 63/291,459, filed Dec. 20, 2021, the disclosures of each of which is incorporated by reference in their entirety.

FIELD OF THE INVENTION

The invention relates to robotically controlled and coordinated surgical procedures. In particular, the invention relates to robotic systems comprising bilateral multiple robotic elements, such as robotic arms, end effectors, surgical instruments, anatomy protection tools, cameras, imaging devices, tracking devices, or other devices useful for robotic surgery. The invention also relates to robotic systems wherein the placement and movement of the robotic elements are controlled and coordinated by a single control unit, and wherein all of the robotic elements are based on a single mobile rigid chassis and, thus, are robotically coordinated at a single origin point. Specifically, multiple robotic elements may be attached to, and controlled by, a single control unit and may be used in a coordinated fashion to deploy and/or relate to surgical instruments, trackers, cameras, and other surgical tools as part of a robotic surgery procedure. More particularly, in the context of robotic spinal surgery, multiple end effectors may be bilaterally deployed on multiple robotic arms and controlled by a single control unit and may be used in a centrally coordinated fashion to perform a robotic surgical procedure, with the relative movements of each robotic element being coordinated by the central control unit. Most particularly, in the context of bone milling (decompression) in robotic spinal surgery, tools for milling bone and protecting anatomical elements such as nerves may be deployed on multiple robotic arms that are controlled in a synchronized and coordinated fashion to perform a safe and effective surgical procedure.

BACKGROUND OF THE INVENTION

Robotic surgery is well known in the art, as is the application of robotic techniques to spinal surgery procedures such as spinal decompression (bone milling). Many robotic surgery systems, such as the da Vinci robotic surgery system from Intuitive Surgical, are teleoperated. Multi-arm robotic surgical systems are available in the field, for example those provided by Cambridge Medical Robotics, but these known systems are often also teleoperated and are all comprised of single arms deployed separately on separate carts or chassis with some level of coordination provided by a remotely-positioned control unit. Systems comprising multiple arms on multiple carts have significant drawbacks regarding integration into surgical workflow, along with an undesirably large footprint in the operating room. Also, the control of teleoperated units by a remotely-positioned control unit does not provide the level of control required for a full range of surgical procedures, particularly in the case of spinal surgery. Accuracy will inevitably be inferior to a system where all robotic arms are fixed to, and coordinated by, a single chassis comprising a control unit.

Performance of a full range of robotic spinal surgery procedures, including robotic spinal decompression, requires robotically coordinated navigation/sensing which is not available today. A typical procedure may require the maneuvering of one or more end effectors deployed by robotic arms, the deployment of other instruments, placement of multiple passive or active markers on bone and/or on soft tissue, and one or more robotically controlled and maneuvered cameras/sensors that can be placed at varying distances and angulations from the surgical field, and one or more end effectors deployed by robotic arms. Such a bilateral multi-arm/multi-camera/sensor system mounted on, and controlled by, one cart, is not available in the current state of the art. There is a strong and long-felt need for such a system as it will enable the performance of a full range of spinal surgery procedures with robotically coordinated control and navigation at a level of accuracy not currently possible.

The need for a centrally coordinated multi-faceted approach is felt strongly in spinal decompression procedures. In spinal decompression, there is a need to mill bone in various ways, shapes, forms and orientations. In many cases, the decompression process is performed to relieve the pressure that the bony anatomy is placing on sensitive nerves. In many such cases, the nerves and/or spinal cord are practically touching if not completely pressed by the bony anatomy of the spine. This demonstrates the basic problem and danger associated with bone milling, whether performed robotically or by other techniques. Namely, no matter how accurate a conventional robotic or non-robotic approach is, when the milling tool carries out the bone milling, it is directly adjacent to, or indeed touching delicate nerve or spinal cord structures. This poses an unacceptable risk of catastrophic damage.

In conventional procedures, whether performed robotically or non-robotically, protective surgical tools may be placed between the bony anatomy and the nerve or spinal cord structures to attempt to protect those nervous system structures from the milling tool. This approach is not always successful and, in any event, is imprecise due to the milling tool and protective tool being held manually or by robotic arms that are not well coordinated with each other. Where there is a consequent risk of lack of precision, there is then a risk of the protective tool not completely guarding the nerve or spinal cord and, thus, there is a risk of damage to those structures. Moreover, robotic accurate synchronization of the protecting tool and the milling tool will enable automatic robotic milling which will enable prior planning of the required milling and accurate execution by the robotic system, which will inevitably improve the clinical outcomes.

A system that robotically synchronizes the placement and movement of the bone milling tools and anatomical protective tools would ameliorate this concern to a great extent because the tools would be held by robotic arms whose movements are synchronized with each other, thus reducing the risk of harm. The holding and placement of the tools by synchronized robotic arms provides greater accuracy and therefore greater safety. Such a system is provided in the context of the present invention. Furthermore, when utilizing the said system, and autonomous robotic capabilities, the need for the milling tools and the protective tools to be robotically coordinated and not only coordinated by conventional navigation techniques, is significantly higher and more important.

SUMMARY OF THE INVENTION

Provided herein is a robotically controlled surgical system. Specifically, the inventive system is a centrally coordinated and synchronized robotic system for bone milling applications (e.g. spinal decompression, orthopedic application, skull, ENT, etc.). The system comprises multiple robotic arms that each can hold at least one end effector, camera/sensor or navigation element for use in the relevant application e.g. spinal decompression procedure. The end effectors may include milling tools and anatomical protection tools, such as tools for the purpose of protecting nerve or spinal cord elements of the spinal anatomy e.g. spatula). The cameras/sensors and navigation elements are for providing guidance and/or tracking for the movement of the robotic arms and/or anatomy parts and deployment of the end effectors and tools.

The invention comprises multiple robotic arms which, through the holding and deployment of end effectors and/or cameras/sensors, mill the bone, protect the anatomy and can provide navigation support in an automatic and safe way because they are robotically synchronized. In one embodiment, there may be three robotic arms, one holding a milling tool, one holding a protective tool and one holding a navigation/tracking sensor e.g., navigation camera. In such an embodiment, the first arm holds a protective instrument which may serve to retract, deflect, protect or manipulate the sensitive organ e.g. nerve, spinal cord etc. from the bony anatomy that is about to get milled. The second arm holds a milling tool (e.g. high speed burr) that mills the bone. A third arm holds the monitoring camera/sensor that provides an image and/or other important data of the process from an optimal distance and angulation. The camera is able to operate from optimal distance and angulation because it is sized appropriately and its deployment on an appropriately sized and positioned robotic arm. Optionally, the robotic arms holding milling tools or protective tools may also hold additional imaging or navigation cameras to provide redundancy and diversity of information.

The synchronized movement of the robotic arms is enabled by the interaction of the navigation cameras with active or passive markers that are placed on the bony anatomy at the beginning or during the procedure. The movement of the robotic arms is synchronized by a central control unit from a single mobile base that knows where the arms are based upon the navigation information provided by the markers and the cameras.

Accordingly, in various embodiments of the inventive system, passive or active markers may be placed on the bony anatomy and may be used to assist in navigation/tracking during a spinal decompression procedure or other bone milling application. These procedures may require the placement of a single or multiple passive or active markers on the bony anatomy of one or multiple vertebrae. In particular embodiments, miniature markers may be preferred. Vertebrae are relatively small and so to place multiple markers on different vertebrae (and indeed on different components of the bony anatomy of the vertebrae) it may be advantageous to use relatively very small markers (1 cm or less in size). When using small markers, it may be advantageous to have the one or more cameras/sensors be deployed quite close to the surgical field, for example at a distance of 30 cm or less from the surgical field, and also at an advantageous angulation relative to the surgical field so that the marker(s) can be visualized. For example, if a small marker is deployed at an inconvenient angle inside the patient's body, it will be advantageous to position the camera/sensor at a close distance and an appropriate angle. This arrangement can then provide appropriate navigation/sensing information to the central control unit and provide for coordinated movement of the milling tool(s) and protective tool(s). Moreover, besides the ability to bring the camera/sensor close to the organ or target and in an optimal angulation, the centrally coordinated system can calculate and determine the best position to place the robotic arms also in relation to each other, to the patient and the ever-changing clinical staff positions among other things, to prevent collisions and allow for convenient workflow.

The inventive approach allows for synchronized operation of the multiple robotic arms, in many embodiments three arms are chosen. The milling arm holding the milling tool is always working in synchronization with the protective tool and the arm holding the sensor/navigation camera.

Optionally, three robotic arms can hold two milling tools and one protective tool in addition to any navigation elements that are present. In this embodiment, there is a synchronized working pattern between the 3 arms. The two milling arms are always working in synchronization of the milling tool and the protection tool, with the milled bone is in the center. This way both arms can always be aligned with each other in relation to the bone while the bone is always protected. Also the third arm holding the camera is also synchronized so also positioned in the optimal place to view the bony markers and the milled bone. Moreover, since the system enables deployment of the arms from both sides of the patient (bilaterally), the mass of the robotic arms is mainly positioned at the sides of the patient so the operating field is clear for surgery and for clear imaging/sensing by the third arm.

In alternative embodiments of the present invention, two end effectors (e.g., the milling and the protecting end effectors) have the capability to sense contact or near-contact between them. This can be achieved with various technologies, such as electrical conductivity, magnetic inductivity and capacitive sensing. Solely by way of example, when a signal is created which means that the milling tip is approaching contact or has made contact with the protective tool, the system controller can perform several actions like stopping the milling action or continuing the milling in a different direction. The robotic synchronization of the inventive system provides perfect alignment of the milling tools and protective tools with the bony anatomy and nerve structures to achieve optimal bone milling. The ability of the milling tool and the protective tool to sense each other by closing an electrical circuit provides a crucial safety feature, prevents over-milling and allows for smooth continuation of the spinal decompression procedure without risk or delay.

In various embodiments of the present invention, the protective end effector or protective tool comprises at least two portions, most often disposed on opposite sides of the tool. One side is often, although not exclusively, made of metal so that it can close an electrical circuit when making contact with the bone milling tool. The other side of the protective tool is constructed and configured to be able to sense a nerve structure. It may be configured to detect the presence and/or proximity of the nerve structure and may additionally be configured to stimulate the nerve structure.

In some alternative embodiments, the second portion of the protective end effector or tool which touches the nerve is comprised of a different material which serves as a sensor to the nerve condition. It can be solely a sensing portion that senses the nerve condition or proximity (e.g. impedance measurement) and reports to the main controller or it can also be a stimulator which provides a measured stimulation to the nerve (e.g. $10 ma$) and receives a feedback signal. This capability can serve as a second feedback loop for protecting a delicate nerve structure while milling the bone. In case the central controller receives a signal which can be interpreted as, for example, the end effectors placing too much pressure on the nerve, the main controller can modify the relative milling position between the two arms and create a better milling posture between the two arms which applies less pressure to the nerve.

Furthermore, another benefit arises from the fact that the protecting tool and the milling tool are connected to different robotic arms and not just utilized together as one device on one robotic arm (for example). By being on separate arms, which are still of course robotically connected and synchronized, the robotic controller through the algorithm embedded in it can have several options for optimal milling and safety measures. For example, in some cases it is better to just stop the high-speed burr from rotating as a safety measure, but this action is not always optimal in surgery, because sometimes just stopping the high speed burr during milling will cause it to get stuck in the bone. Sometimes the optimal safety measure will be to back off the high-speed burr a few millimeters away from the anatomy. Sometimes from clinical or convenience considerations the milling tool and/or the protecting tool should approach the area from specific angle/location etc. meaning, separating the milling tool from the protecting tool but still enable them to work accurately in conjunction with each other has significant value in robotic bone milling procedures. For another example of the benefit of separating the milling tool from the protecting tool through different synchronized robotic arms will be that this method will enable for example the arm to move aside to replace a milling tool while the other arm is still holding and protecting the nerve. Moreover, if more than 2 arms are busy with milling, one can go and replace a tool while the other is still working. This has the potential to significantly improve the efficiency in the surgical process.

All of these needs and elements benefit tremendously from the central coordination and synchronized control of the inventive single-cart, multi-arm, bilateral non-teleoperated robotic system. Based on the placement of appropriately sized markers and the placement of navigation cameras at an appropriate distance and orientation to the target anatomy and the markers, movement of the robotic arms carrying end effectors and cameras can be coordinated to provide for a safe and precise robotic spinal decompression procedure.

DETAILED DESCRIPTION OF THE INVENTION

With reference now to the figures and several representative embodiments of the invention, the following detailed description is provided.

Figure 1A:
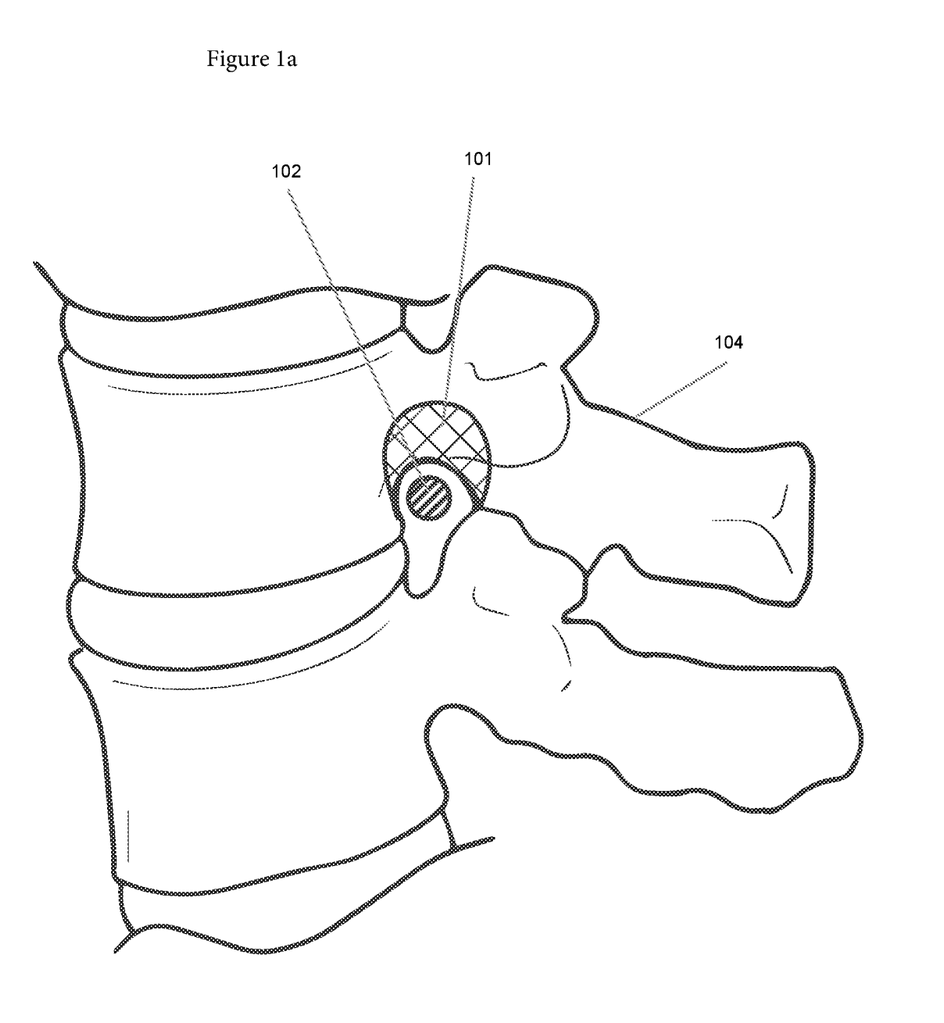
FIGS. 1a, 1b and 1c show various views of the spinal anatomy with portions of bone that may require milling adjacent to nerve or spinal cord structures.
Figure 1B:
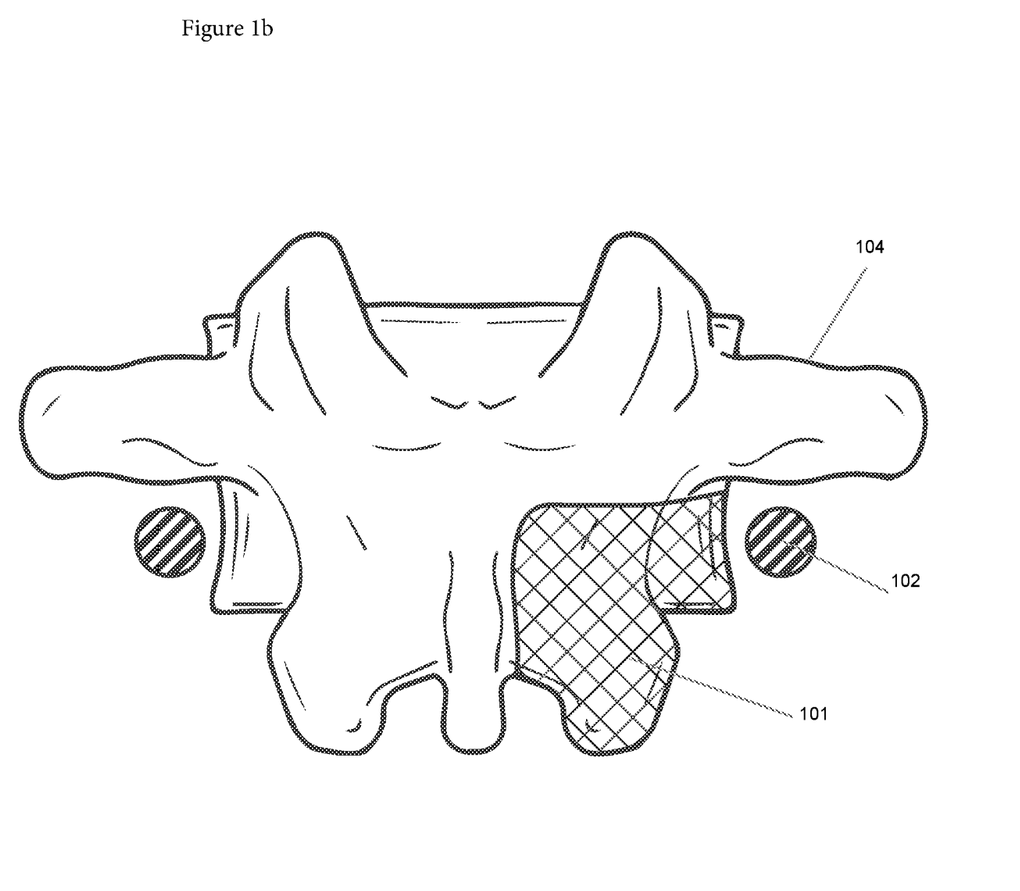
Figure 1C:
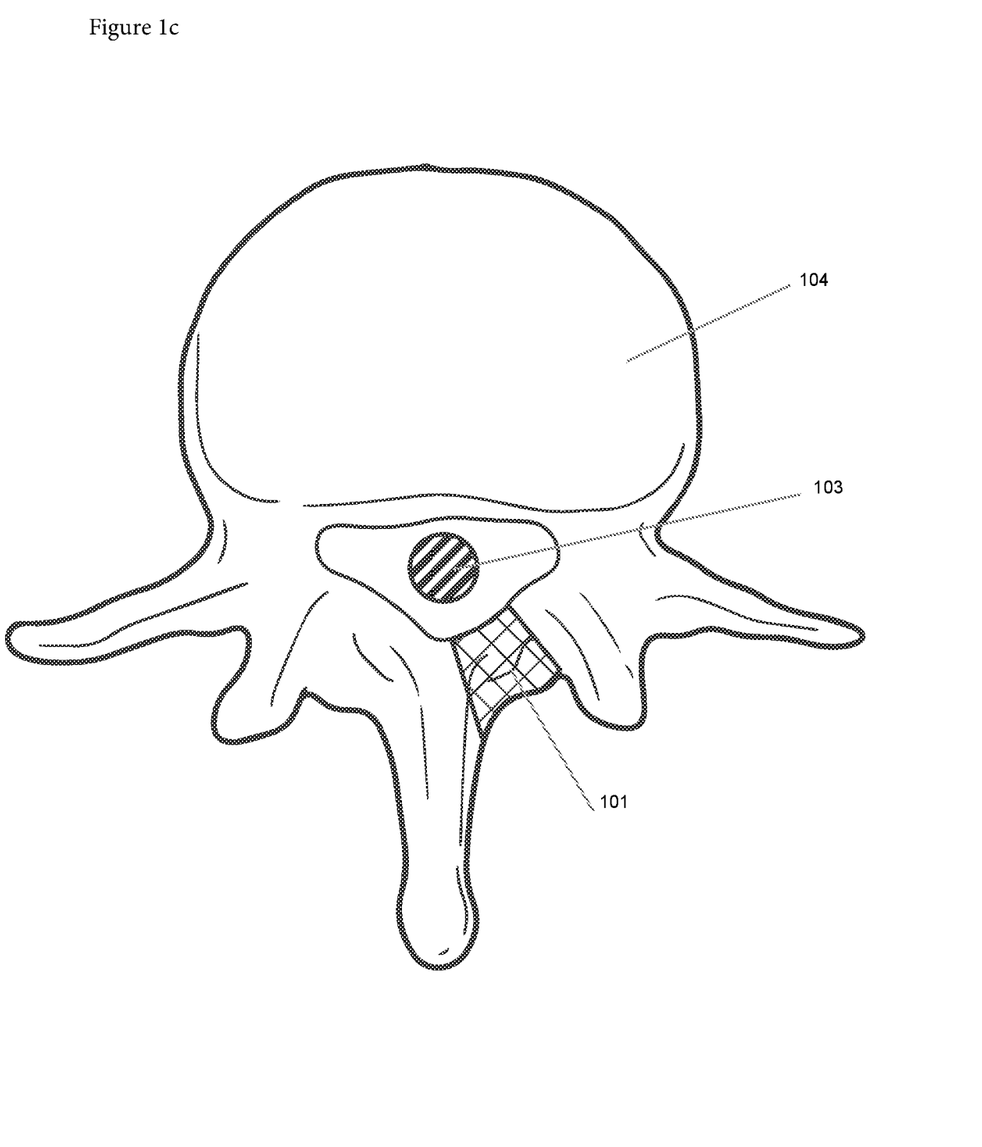

In a working example of the invention exemplified by FIG. 1, several views of spinal bony anatomy are shown. In each of the three views, a vertebra 104 is shown. In each case, a portion 101 of the vertebra 104 requires milling, for example because it is pressing on an adjacent nerve structure. In various of the views, a nerve root 102 and/or the spinal cord 103 are shown. Use of the inventive system with, for example, 3 coordinated robotic arms with, for example, a milling tool, a nerve protection tool and a camera being deployed by the 3 arms, allows for precise milling of the portion 101 of bone while greatly minimizing the risk of catastrophic damage to the nerve root 102 or spinal cord 103 or other nerve structure.

Figure 2:
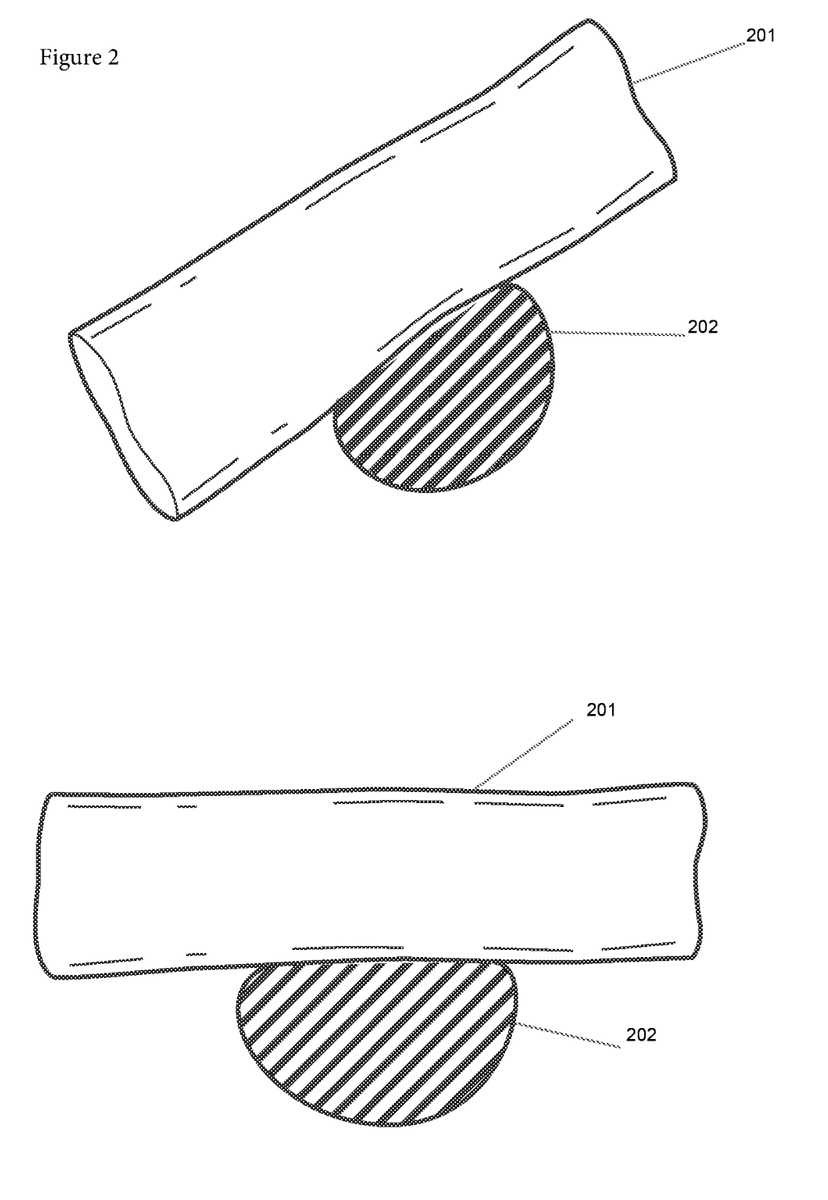
FIG. 2 is a close-up view of a portion of a vertebra that may require milling directly adjacent to a nerve structure.

FIG. 2 shows a close up view of a portion of bony anatomy 201 immediately adjacent to a nerve root 202 or other nerve structure. With this arrangement of bone and nerve structures, milling of the bone (or decompression) will often be required as an appropriate surgical treatment due to the portion of bony anatomy 201 pressing or impinging on the nerve root 202 or other nerve structure. This problem requiring surgery is often caused by stenosis or other compression which can be caused by various reasons such as age degeneration, congenital and non-congenital deformation, trauma etc.

Figure 3:
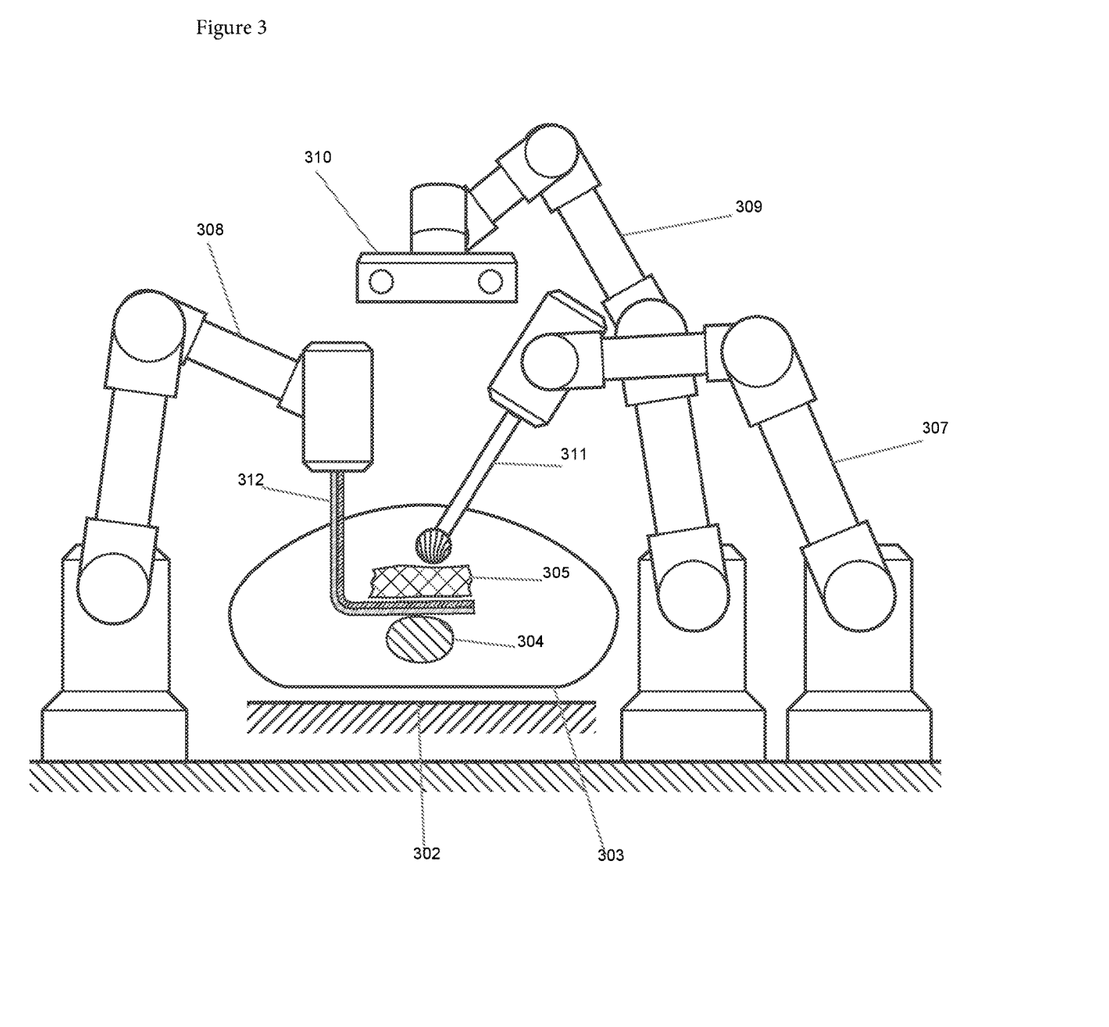
FIG. 3 shows a robotic system according to a representative embodiment of the present invention wherein multiple centrally coordinated robotic arms hold milling and protective tools.

FIG. 3 shows a robotic system for bone milling according to an embodiment of the present invention. The robotic arms of the inventive system are mounted on a single mobile rigid chassis that comprises a centralized control unit, allowing for synchronized movement and control of the robotic arms. In the context of spinal decompression procedures, this synchronized control allows for precise bone milling at optimal angles and orientation.

The system's structure and morphology enable optimal deployment of the multiple robotic arms from both sides of the patient bilaterally. This special deployment of the robotic arms keeps its main mass at the sides of the patient so the surgical field is clear for surgery and imaging/sensing by the third arm and/or the surgeon. Moreover, the said method of deployment and positioning of the robotic arms enables the arms to approach the surgical area and specifically the milled bone most of the times while being in a partial folded position. It is well known in the art that robots are more rigid, hence more accurate, when they are partially folded, meaning not in a fully extended position. Standard robotic systems known in the art today, unlike the current inventive system, are positioning the arms relatively far from each other and from the patient which requires the arm to reach far often in a fully extended configuration and thus lose accuracy.

In FIG. 3, robotic arms 307, 308 and 309 are shown mounted to a rigid chassis 301 that may optionally be mobile. The robotic arm 307 holds a milling tool 311. The robotic arm 308 holds a nerve protective tool 312. The robotic arm 309 holds a camera 310. In this embodiment "navigation camera" is used as a main method for the robots/tools/patient tracking while it can be comprised of several alternative technologies such as visual light imaging, X-ray, MRI, magnetic tracking, laser sensing and more. Also shown in FIG. 3 is a surgical table 302 that the robotic system fits under (and, if mobile, may optionally be deployed under the table and/or removed before, during and after the surgical procedure) and a patient body 303. In the patient body a nerve structure 304 and a portion of bony anatomy 305 that requires milling are shown. The protective tool 312 is placed between the nerve structure 304 and the portion of bony anatomy 305 so that the milling tool 311 can carry out precise milling without fear of damage to the nerve structure 304. The camera 310 helps to bring the robotic arms 307, 308 and 309 to the appropriate position with respect to the surgical field with the assistance of a miniature marker 306 that is placed at the beginning of the surgical procedure. The camera 310 can then monitor the progress of the surgical procedure from an optimal angle.

Today the common way to track the operated organ e.g. boney anatomy and/or more specifically vertebral body is to place a marker on it while the marker must stand high above the open wound e.g. 5-25 cm due to the basic reason that it needs to be visible to the camera/sensor that is passively placed 1-3 meter away. This way the ability of this long, light weight marker to keep its position relative to the bony anatomy is limited and therefore its accuracy is very low. From this reason up until today this tracking technology is seldomly used for delicate accurate tasks such as spinal decompression. In the present invention, thanks to the active close range and maneuvering robotic arm that holds the camera/sensor and is able to bring it within close proximity to the open wound, the markers can be very small (e.g., 1 cm and less) and by that being rigidly connected to the milled bone and stay highly accurate. The markers can be passive or active markers and can support several tracking/sensing technologies e.g., visible light different colors combination and contrast, infra-red reflection, magnetic resonance, laser and more. Moreover, thanks to its miniature size i.e., small size and several grams weight, they be directly screwed to the bone (e.g., 3-6 mm threads) and stay secured and by that provide unprecedented accuracy. One of skill in the art will understand that, with markers of this small size, and the navigation camera being held close to the surgical field to achieve optimal angles, multiple, small, active or passive markers can be placed on several aspects of a single vertebra for optimal visualization.

In alternate embodiments of the present invention, additional navigation cameras can be placed on the robotic arms holding the milling tools. In another alternative, additional navigation cameras can be placed on end effectors held by the robotic arms also holding the milling tools. The placement of additional cameras on the operating/surgical arms can further enhance the view of the surgical field and provide additional information for providing the small markers. The skilled artisan will understand that each of the cameras can be placed with great precision and provide an enhanced view of the surgical field due to the coordinated movement of the robotic arms that are mounted on a single mobile chassis with a central control unit.

Figure 4:
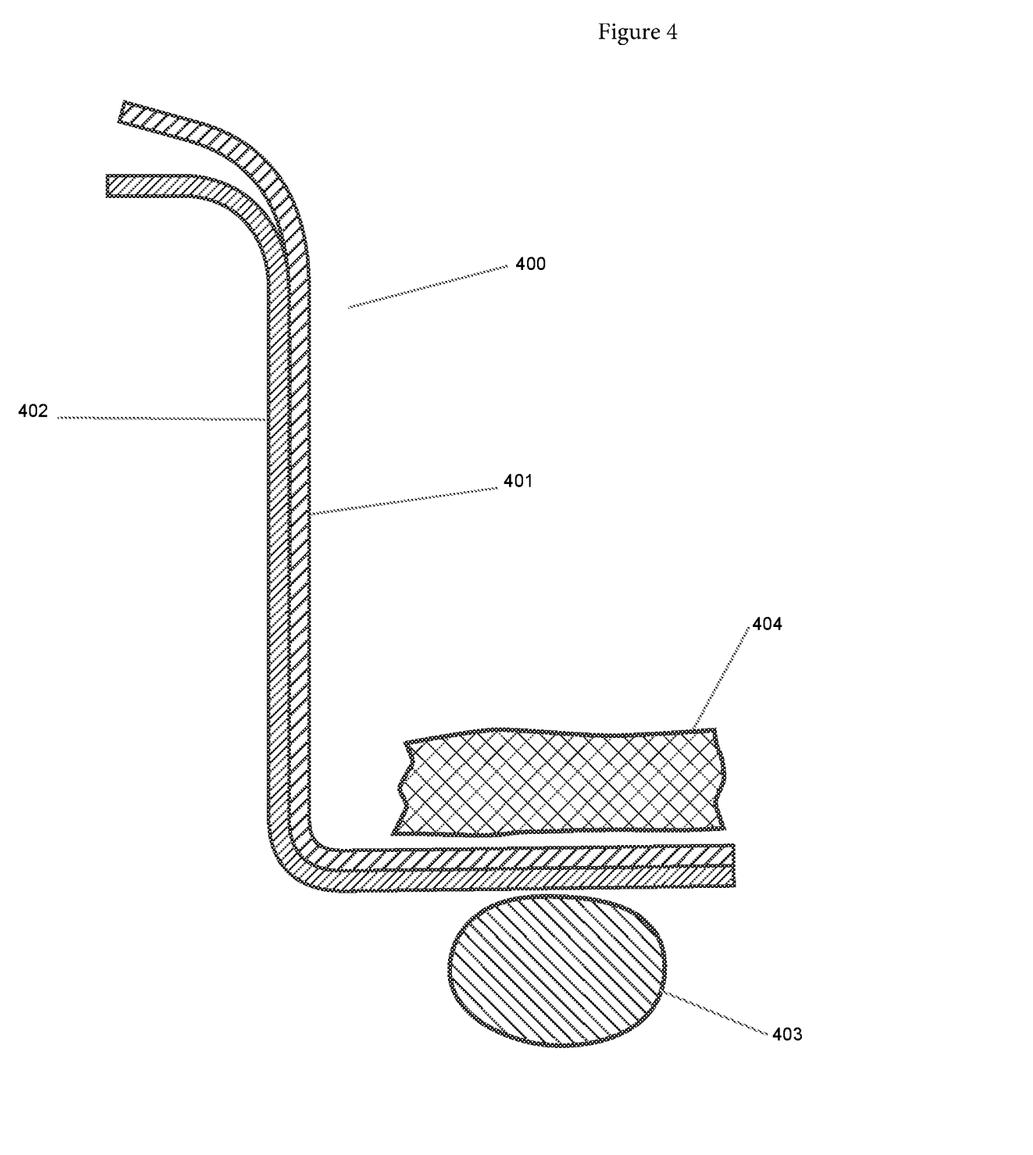
FIG. 4 shows a protective end effector according to a representative embodiment of the present invention comprising conductive and sensing elements.

FIG. 4 provides a close-up view of a sensitive organ (nerve) protective tool 400 according to an embodiment of the present invention. The protective tool 400 comprises two portions including a metallic portion 401 configured to protect the critical nervous system structure and a sensing portion 402 configured to close an electric circuit when it makes contact with the bone milling tool. The tool can have several sizes and shapes to fit the various decompression and bone milling techniques. Some in the form of small spoon shape, starting from 1-2 mm wide to long, curved or flat spatula. Also, today there are common in the market hundreds of bone milling high speed burs and dozens of tools which are used manually by surgeons as a 'protective tool'. The specific design of the milling bure and the protective tool are application dependent but also dependent on the specific surgeon personal taste, preference, surgical philosophy, training etc. The robotic arms can adjust its robotic motion and milling technique according to the surgeon planning and chosen technique and tools.

The metallic portion 401 of the sensitive organ protection tool 400 sits adjacent to the bony anatomy 404 and can interact with the milling tool during the procedure. In one embodiment, when the milling tool contacts the metallic portion, a circuit is closed and a signal is sent to the control unit in the rigid chassis of the robotic system that can then send feedback to stop the milling tool, reverse the milling tool, or take some other action to ensure precision and safety in the surgical procedure. There could be several material combinations that can facilitate this requirement and it is not limited to one specific material. An electric closed circuit between the milling tool and the protective tool can be achieved almost by any bio-compatible metallic substance (e.g., steel, Titanium, Aluminum etc.). Additional relevant technologies can be comprised of the use of magnetic induction, capacitive sensing and more. All are based on the close proximity of the milling tool and the protective tool which are centrally governed. The sensing portion 402 of the protective tool 400 can either sense or stimulate the nerve structure 403 during the surgical procedure, again to ensure precision and safety in carrying out the procedure.

The protective tool serves as a barrier between the milling tool and the sensitive organ which requires positive, active, dynamic continuously changing protection. This tool has several functions. On the one hand it physically separates the sensitive organ from the soon to be milled bone (sometimes this organ is pressed against and physically stuck to the bone). This tool may be comprised from at least two different materials with at least two different functionalities. The upper part that is facing the bone and the milling tool is comprised of the material that fit the technology chosen to close the circuit with the milling tool. The lower part which touches the sensitive organ e.g., nerve can also be comprised of several materials. It can be passive from a soft material e.g., plastic, silicon etc. it can be made of nonconductive isolating material to prevent any electrical flow to the nerve e.g., plastic, ceramic etc. and it also can be made from a sensing/electrode substance that has the ability to one way sense chemical and/or electrical signals from the nerve (nervous system). It can also be active by having the ability to transmit low electrical current e.g., 10$ma$ and also sense the nerve reaction. This sensing technology is well established in the art but not in conjunction with a multi arm robotic system. This system, tools and technique can provide multiple tools and methods for milling bone, protecting sensitive organs and sensing passively or actively at any given step of the procedure. This sensing can be done by surgeon choice, by robotic algorithm or randomly per specific period or action. This combination of robotic, sensing and intelligent tools can enable a multilayer system with several safety layers.

All of the embodiments shown in FIGS. 1 through 4 can be used in inventive methods of carrying out spinal decompression procedures. In one such example, the robotic system shown in FIG. 3 can deploy a milling tool 311 on a robotic arm 307, a protective tool 312 on a robotic arm 308 and a camera 310 on a robotic arm 309. The camera 310 and end effectors are deployed to the optimal position for the procedure partially by navigation enabled by the placement of a marker 306. Once the robotic arms 307, 308 and 309 are in the optimal location and angulation, the protective tool 312 can be deployed between a portion of bony anatomy 305 that requires milling and a nerve structure 304 that requires protecting and milling can proceed. Use of the inventive system and method allows for precise, safe milling to take place with appropriate safeguards for stopping or reversing the milling as required.

In alternate embodiments of the present invention, the operating/surgical robotic arms (those holding the surgical tools for decompression/milling or other tasks) are also equipped with torque sensing capabilities. The bony anatomy of the spine is known to move during spinal surgical procedures due to movement of the patient and also forces applied during the surgery. Accordingly, if the robotic arms are capable of sensing torque feedback, this can help in tracking of the bony anatomy (along with information provided by the navigation cameras tracking the markers placed on the bony anatomy). Again, since the robotic arms are robotically coordinated by the central control unit on the single, mobile chassis, torque information can be taken into account by the central control unit (along with, for example, navigation information) in order to more accurately track the anatomy and the robotic arms. This, in turn, produces more accurate results in delicate procedures such as bone milling.

One of skill in the art will realize that several variations on the disclosed embodiments are possible while staying within the bounds of the current invention. Solely by way of example, different variations in the number of navigation cameras, robotic arms, markers and end effectors can be used without departing from the invention. As another example, markers of varying sizes can be used. The embodiments provided are representative in nature.

What is claimed is:

1. A system for milling a bony anatomy in a patient, wherein the bony anatomy lies adjacent to a sensitive organ, said system comprising:
   a robotic surgery apparatus comprising at least three robotic arms disposed on a single cart and a central control unit disposed in the single cart;
   a bone milling tool configured to be held by a first of the at least three robotic arms;
   a sensitive organ protection tool including a barrier, wherein the barrier is configured to be positioned between the bony anatomy and the sensitive organ and to physically separate the sensitive organ from the bony anatomy, wherein the sensitive organ protection tool is configured to be held by a second of the at least three robotic arms; and
   a camera or sensor held by a third of the at least three robotic arms;
   wherein the central control unit is configured to control and synchronize the positions of each of the bone milling tool, the camera or sensor, and the barrier of the sensitive organ protection tool to (a) automatically position the first robotic arm to advance a distal end of the bone milling tool into the bony anatomy in a direction toward the sensitive organ to mill the bony anatomy in accordance with a prior plan, (b) position the third robotic arm to allow the camera or sensor to track movements of the bone milling tool, and (c) position the second robotic arm to maintain the barrier in place between the bony anatomy and the sensitive organ to prevent the bone milling tool from milling the sensitive organ.

2. The system of claim 1, wherein the single cart is mobile.

3. The system of claim 1, wherein at least one of the at least three robotic arms is deployed on a side of the patient.

4. The system of claim 1, wherein the sensitive organ is a critical nervous system structure.

5. The system of claim 4, wherein the barrier of the sensitive organ protection tool comprises:
   a metallic portion configured to close an electric circuit when it makes contact with the bone milling tool; and
   a sensing portion configured to sense a nerve structure to detect the presence and/or proximity of the tool to the nerve structure.

6. The system of claim 5, wherein the sensing portion is additionally configured to stimulate the critical nervous system structure.

7. The system of claim 1, wherein at least one small active or passive marker is placed on the bony anatomy of a vertebra of the patient as part of a spinal decompression procedure.

8. The system of claim 7, wherein at least two small active or passive small markers are placed on the bony anatomy of the vertebra of the patient.

9. The system of claim 8, wherein the camera or sensor is held close to the bony anatomy of the vertebra of the patient.

10. The system of claim 9, wherein the small markers are less than 1 cm in size and the camera or sensor is held less than 1 meter from the bony anatomy of the vertebra of the patient.

11. The system of claim 1, wherein additional cameras or sensors are placed on the robotic arm holding the bone milling tool and on the robotic arm holding the sensitive organ protection tool.

12. The system of claim 1, wherein the robotic arm holding the bone milling tool and the robotic arm holding the sensitive organ protection tool are equipped with torque sensing capabilities.

* * * * *